Sept. 27, 1966     R. L. ROWAN ETAL     3,275,509
METHOD FOR TREATING INTESTINAL DISORDERS
WITH A SILICONE COMPOSITION ENEMA
Filed April 24, 1963
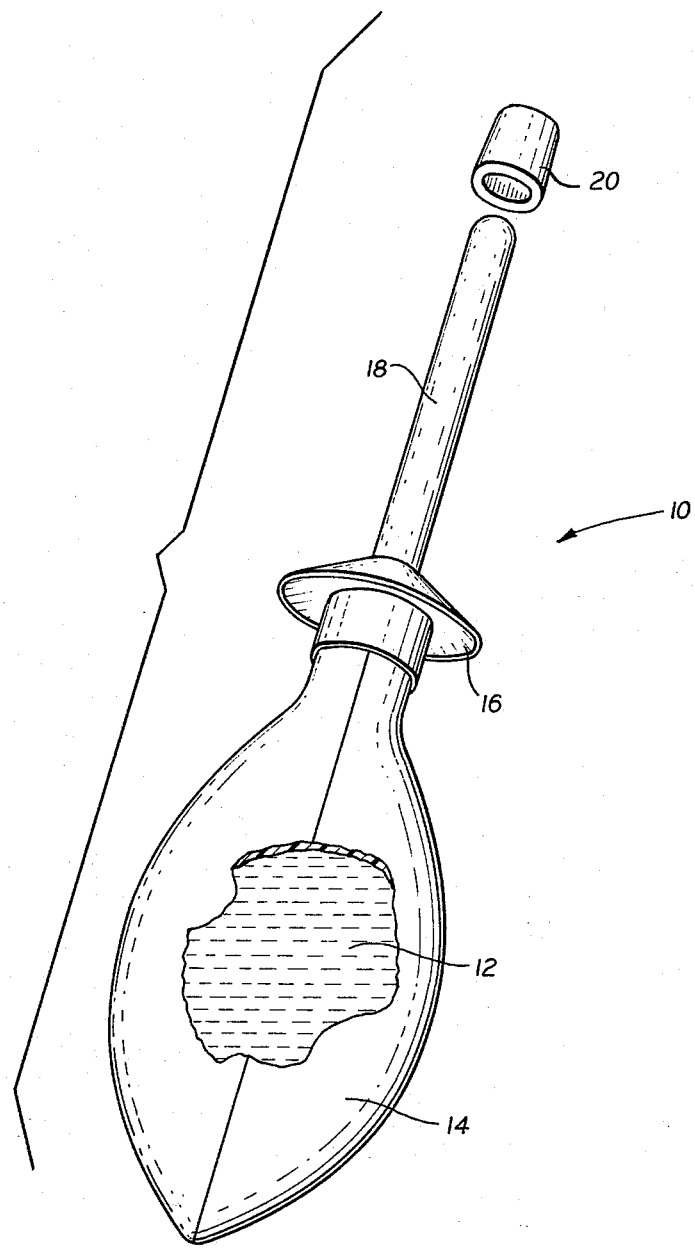
INVENTORS
ROBERT L. ROWAN
YETTA ROWAN
BY *Arthur O. Klein*
their
ATTORNEY.

United States Patent Office 3,275,509
Patented Sept. 27, 1966

3,275,509
METHOD FOR TREATING INTESTINAL DISORDERS WITH A SILICONE COMPOSITION ENEMA
Robert L. Rowan and Yetta Rowan, both of 141 E. 33rd St., New York, N.Y.
Filed Apr. 24, 1963, Ser. No. 275,369
4 Claims. (Cl. 167—56)

This invention relates to a method and means for treating disorders of the lower intestinal tract with a therapeutic composition and more particularly with a silicone composition enema used to coat the interior walls of the human lower intestinal tract.

It is a general object of this invention to provide a method for the introduction of an enema into the lower intestinal tract of the human body.

It is another object of this invention to provide a method for relieving an inflammation of the human lower intestinal tract.

It is a more specific object of this invention to provide a method whereby the walls of the human lower intestinal tract are coated with a stable and chemically inert fluid and are thereby insulated from ambient internal irriating fluids, simultaneously therewith, stools are lubricated easing thereby their passage.

Still another object of this invention is to provide a disposable squeeze bottle containing a new chemical for use as an enema in the treatment of disorders in the human lower intestinal tract.

Other objects of this invention will become apparent to those skilled in the art in the light of the following description.

In accordance with this invention the claimed method and means use as a therapeutic composition a liquid having as an ingredient an organo-silicon oxide polymer (or organo-polysiloxane). These liquids are also popularly called silicones.

It is known that organopolysiloxanes are generally insoluble liquids. However, in order for a liquid to be adapted for internal use as a coating agent and/or enema for the human lower intestinal tract it must have several other chemical, physical and physiological properties. For instance, such a liquid should have great thermal and oxidative stability. The liquid should be chemically inert with the human body fluids. It should be completely non-absorbed in the intestinal tract. It should have a low volatility.

Although certain organo silicon compounds (nonpolymers) are absorbed in the intestinal tract, it has been found that organo-polysiloxane and in particular dimethylpolysiloxane liquids have all of the aforementioned desirable properties. Furthermore studies have shown that dimethylpolysiloxane liquid is, when applied within certain limits into the lower intestinal tract, completely nontoxic.

The general chemical formula of organopolysiloxanes can be represented as follows:

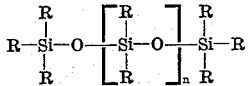

where R is a $CH_3$ or other organic radical and $n=0$ to 2000.

The chemical formula of the dimethylpolysiloxane fluid can be generally represented as follows:

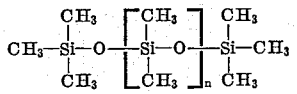

wherein the length $n$ of the polymer chain determines the viscosity of the fluid.

It is well known in the art to use mineral oil as an enema. This type of an enema is commonly referred to as an "oil retention enema." It serves to soften and lubricate hard stools thereby easing their passage. The "oil retention enema" has also been found valuable for treating constipation particularly where straining must be avoided. Mineral oil, however, can have certain untoward effects when used internally in the human body. For instance it is known that mineral oil will be absorbed to a certain extent in the intestinal tract. It is also known that certain fat-soluble vitamins and nutrients such as vitamins A, D, E and K will be absorbed and consequently removed from the intestinal tract by the "oil retention enema." The organopolysiloxane fluids, on the other hand, are completely inert in the human lower intestinal tract. Furthermore, since the viscosity of the organopolysiloxane fluids can be pre-selected it will be apparent that these fluids can have excellent lubricating properties.

It has also been found that when introducing the dimethylpolysiloxane liquid into the lower intestinal tract that fluid effectively coats the walls of the lower intestinal walls and thereby acts as a barrier between the inflamed mucosa walls and the feces.

The coating action of the dimethylpolysiloxane liquid is so effective because of its relatively low surface tension. For instance, in a viscosity range of 10 centistokes to 1000 centistokes the surface tension of the dimethylpolysiloxane liquid has an approximate corresponding range of about 20 dynes/centimeter to about 21.5 dynes/centimeter. When comparing this with the surface tension of water which is about 72 dynes/centimeter and of mineral oil which is about 30–40 dynes/centimeter it becomes apparent why this liquid due to its high surface activity, is such an effective coating agent.

The organopolysiloxane oil retention enema forming part of this invention is preferably applied through a plastic squeeze which is illustrated in FIG. 1 of the accompanying drawing.

FIG. 1 is a perspective exploded view of a plastic squeeze bottle wherein 10 represents the unit as a whole.

Referring now more particularly to the drawing there is shown in FIG. 1 an ampulla which has an open-ended tubular-shaped head or front piece 18 which is enlarged and flares outwardly at its one end 16. The front piece 18 is preferably rounded at its front end and is closed by an elastic cover or cap 20 in order to protect the mouth piece 16 and the contents of the ampulla during shipping and storage. The front piece 18 is made from a material of reduced elasticity, for instance, polystyrene or other known resinous material. The rear piece 14 is bulb-shaped and made from an elastic material. The bulb-shaped piece 14 is screwed or press fitted into the front piece 18. A predetermined quantity (about 127 cc. for an adult) of organopolysiloxane liquid 12 is stored in the bulb-shaped piece 14. The entire unit is unbreakable and is meant to be used one time only, thereafter the unit is discarded. Practically all the liquid stored in the bulb-shaped piece 14 can be ejected from the front end of the front piece 18 by manually squeezing the elastic piece 14.

Examples of treating a patient by the aforedescribed method is hereinafter given by way of illustration but not by way of limiting the claims set forth below to these examples only.

*Example 1*

A sterile disposable squeeze bottle 10 is used. The rectal tube is pre-lubricated with petroleum jelly or other suitable lubricant. The squeeze bottle is meant to be discarded after using it only once. The rectal tube is then inserted into the rectum by the usual known method and approximately 120 cc.–130 cc. of an organopolysiloxane liquid are introduced into the lower intestinal tract of the patient via the rectum by manually squeezing the plastic squeeze bottle 10. The bottle is then discarded.

*Example 2*

A sterile disposable squeeze bottle 10 is used. The rectal tube is prelubricated with petroleum jelly or other suitable lubricant. The squeeze bottle is meant to be discarded after using it only once. The rectal tube is then inserted into the rectum by the usual known method and approximately 120 cc.–130 cc. of dimethylpolysiloxane liquid having a viscosity in the range of 350–1000 centistokes are introduced into the lower intestinal tract of the patient via the rectum by manually squeezing the plastic squeeze bottle 10. The bottle is then discarded.

Although preferred examples of the invention have been described, it will be understood that modifications may be made within the spirit and scope of the appended claims. It will also be understood that there is no intention to include unmentioned ingredients other than minor impurities.

What we claim is:

1. A method of treating intestinal disorders of the lower intestinal tract, which comprises the step of introducing a nontoxic organopolysiloxane liquid into the lower intestinal tract, via the rectum, thereby coating the walls of said lower intestinal tract with said liquid, said organopolysiloxane liquid having a viscosity within the range of 350 to 1000 centistokes.

2. A method of treating intestinal disorders, which comprises the step of introducing a nontoxic dimethylpolysiloxane liquid into the lower intestinal tract, via the rectum, thereby coating and lubricating the mucosa walls of said lower intestinal tract, with said liquid, said dimethylpolysiloxane liquid having a viscosity within the range of 350 to 1000 centistokes.

3. The method of claim 2 wherein said dimethylpolysiloxane liquid is introduced by means of a squeeze bottle which is manually squeezed thereby ejecting said liquid.

4. A method of stimulating intestinal motility, which comprises the step of introducing via the rectum dimethylpolysiloxane liquid by means of a squeeze bottle which is manually squeezed, thereby releasing said dimethylpolysiloxane liquid into the lower intestinal tract, via the rectum, said dimethylpolysiloxane liquid having a viscosity range of 350–1000 centistokes, whereby the mucosa walls of the lower intestinal tract will be coated, stimulated and lubricated with said liquid.

References Cited by the Examiner

UNITED STATES PATENTS

| | | | |
|---|---|---|---|
| 2,857,914 | 10/1958 | Carliner | 128—232 |
| 2,869,454 | 1/1959 | Forsyth | 128—232 |
| 2,951,011 | 8/1960 | Feinstone | 167—55 |
| 2,992,970 | 7/1961 | Baptist et al. | 167—56 X |

RICHARD A. GAUDET, *Primary Examiner.*

D. S. BURK, R. L. FRINKS, *Assistant Examiners.*